United States Patent [19]

Watanabe et al.

[11] Patent Number: 5,257,966
[45] Date of Patent: Nov. 2, 1993

[54] PRESS ROLL FOR PAPER MACHINES

[75] Inventors: Atsuo Watanabe; Tatsuyuki Abe, both of Osaka, Japan

[73] Assignee: Yamauchi Corporation, Osaka, Japan

[21] Appl. No.: 771,474

[22] Filed: Oct. 7, 1991

[30] Foreign Application Priority Data

Oct. 8, 1990 [JP] Japan .................. 2-271512
Oct. 8, 1990 [JP] Japan .................. 2-271513

[51] Int. Cl.$^5$ .............. B21B 31/08; B60B 5/00; B60B 21/00
[52] U.S. Cl. ...................... 492/37; 492/48; 492/53; 493/467; 100/155 R
[58] Field of Search ............ 29/121.8, 130, 132; 100/155 R; 162/287, 363; 493/467

[56] References Cited

U.S. PATENT DOCUMENTS

| 2,804,678 | 9/1957 | Rockoff | 29/121.8 |
| 2,863,175 | 12/1958 | Meyer | 29/121.8 |
| 4,441,417 | 4/1984 | Katayama et al. | 29/121.8 X |
| 4,533,581 | 8/1985 | Asaumi et al. | 29/132 X |
| 4,704,776 | 11/1987 | Watanabe et al. | 29/132 |
| 4,888,464 | 12/1989 | Shibata et al. | 29/132 X |
| 4,967,663 | 11/1990 | Metcalf | 29/132 X |
| 4,977,830 | 12/1990 | Fadner | 29/132 X |
| 5,033,380 | 7/1991 | Sonobe et al. | 29/132 X |
| 5,111,567 | 5/1992 | Leino et al. | |

FOREIGN PATENT DOCUMENTS

0425464A1 5/1991 European Pat. Off. .

OTHER PUBLICATIONS

European Search Report, EP 91 11 7054 "Substitutes for Granite Rolls", Eucepa Conference, May 8–11, 1990.

Primary Examiner—Timothy V. Eley
Attorney, Agent, or Firm—Armstrong, Westerman, Hattori, McLeland & Naughton

[57] ABSTRACT

A paper machine press roll comprising a metal core, a ground layer formed over the outer periphery of the core and made of a metal material having a small coefficient of expansion, and a mixture layer formed over the outer periphery of the ground layer and comprising a ceramic and a water retentivity imparting particulate substance such as mica. At least in a surface layer portion of the mixture layer, an organic high polymer such as synthetic resin or wax is filled in the interstices between particles of the ceramic and particles of the water retentivity imparting substance.

5 Claims, 2 Drawing Sheets

PRESS ROLL FOR PAPER MACHINES

BACKGROUND OF THE INVENTION

The present invention relates to a press roll for paper machines, and more particularly to a press roll for use in the press section of a paper machine for removing water from wet paper and making the paper smooth-surfaced.

Roll presses and extended nip presses (ENP) are known as typical means for pressing wet paper for use in the press section of paper machines.

The roll press is so adapted that wet paper supported on a felt is passed between two rotary rolls under pressure for the removal of water. With the ENP, wet paper supported on a felt is dewatered by being passed between a rotary roll and a belt to which pressure is applied by a pressure shoe having a large nip width.

The rotary roll used in either of these systems has a hard surface in view of the pressing effect and surface smoothness. For example, the roll press comprises the combination of a rotary roll having a hard surface and serving as a top press roll and a rubber-covered roll or the like serving as a bottom press roll.

It is required that such hard-surfaced rotary rolls be usable over a prolonged period of time, withstanding a high load and high-speed rotation. To meet this requirement, stone rolls of natural granite (granite rolls) are widely used. Generally, the stone roll can be mirror-finished over the surface, has high surface hardness, is resistant to abrasion by the doctor blade which is usually provided for removing bits of extraneous stock, permits smooth release of wet paper and is less prone to the deposition of pitch or the like contained in the pulp even when used for a long period. Because of these characteristics, the stone roll has the advantage of being less likely to cause breaks of paper during pressing.

While stone rolls are prepared from natural stone, the stone material is expensive and requires a long period for delivery since the material is difficult to obtain owing to the recent trend toward depletion of resources. In fact, extreme difficulties are encountered in collecting, transporting and processing large stones for making stone rolls which become longer and must be larger than in the past.

Further because the material is a polycrystalline natural stone, there is a substantial problem in that the rolls produced differ in the surface characteristics (such as porosity, surface hardness and water retentivity), even a single roll often differing in such surface characteristics from portion to portion.

SUMMARY OF THE INVENTION

The main object of the present invention is to provide a press roll which is free of the foregoing problems for use in paper machines.

The paper machine press roll of the present invention is characterized in that the roll comprises a metal core, a ground layer formed over the outer periphery of the core and made of a metal material having a smaller coefficient of expansion than the metal material forming the core, and a mixture layer formed over the outer periphery of the ground layer and comprising a ceramic and a water retentivity imparting particulate material such as mica.

The water retentivity imparting particulate substance is at least one powder selected from the group consisting of mica powder, glass balloons, glass beads, glass powder, stone powder, sand and fluorine-containing resin powder.

The metal core for use in the present invention is made, for example, of iron, stainless steel, copper, brass or the like.

The metal core is formed with a ground layer made of a metal material which has a smaller coefficient of expansion than the surface material of the metal core but a greater coefficient of expansion than ceramics.

The ground layer serves to bond a ceramic layer to the metal core and to prevent the core from corrosion. The ground layer of metal material is smaller than iron-type metals and copper-type metals in coefficient of expansion. To be suitable, the ground layer is usually about $9 \times 10^{-6}$ to $14 \times 10^{-6}/^\circ$ C. in coefficient of expansion. From the viewpoint of corrosion resistance, examples of suitable materials for the ground layer are molybdenum-type metals and nickel-type metals, among which nickel-chromium alloys and nickel-chromium-aluminum alloys are especially preferable.

The ground layer is formed, for example, by gas spray coating or gas plasma spray coating using the desired metal in the form of particles.

The ground layer has a thickness of about 100 to about 500 micrometers, and serves as a kind of buffer in the event of thermal expansion, preventing the separation between the core and the ceramic layer effectively due to thermal expansion.

When required, a corrosion inhibiting coating may be formed between the ground layer and the core to protect the core from corrosion.

Examples of materials for forming the corrosion inhibiting coating are nickel, nickel-aluminum alloys, copper, stainless steel, etc. Preferably, the coating is 100 to 500 micrometers in thickness.

The mixture layer comprising the ceramic and the water retentivity imparting particulate substance such as mica, contains 5 to 30 wt. % of the particulate substance as mixed with the ceramic.

If the amount of mica or like water retentivity imparting substance is less than 5 wt. %, the contemplated effect will not be available, whereas amounts exceeding 30 wt. % impair the surface roughness and give a lower strength to the mixture layer. The press roll obtained is therefore undesirable.

According to the invention, the mixture layer is formed from a powder of metal oxide for forming the ceramic and mica or like water retentivity imparting particulate substance, by covering the ground layer around the metal core with these materials by plasma spray coating (e.g. water-stabilized plasma spray coating or gas plasma spray coating). Thus, the mixture layer can be formed easily.

In this case, the ceramic and the particulate substance such as mica are mixed together and sprayed onto the ground layer at the same time, or the ceramic and the particulate substance are individually applied to the ground layer using separate powder feeders. In the latter case, it is desirable to feed the particulate substance to a low-temperature portion of the plasma used for spray coating, whereby the degradation of the particulate substance can be prevented.

Examples of typical metal oxides for forming the ceramic are gray alumina (94% $Al_2O_3$—2.5% $TiO_2$), white alumina (99% $Al_2O_3$), titania ($TiO_2$), alumina-titania ($Al_2O_3$—$TiO_2$), mullite ($Al_2O_3$—$SiO_2$), zirconia-mullite ($Al_2O_3$—$ZrO_2$—$SiO_2$) and the like. These materials can be used singly or in admixture. Other metal oxide, low-melting alloy, metal carbide, metal nitride or the like which is applicable by spray coating can be admixed with such a material to form the ceramic.

The particle size of the material to be used for spray coating is 10 to 200 micrometers to be suitable.

Useful plasma spray coating apparatus are water-stabilized plasma spray coating apparatus wherein water is used as the plasma source, gas plasma spray coating apparatus wherein argon, helium, hydrogen or nitrogen is used as the plasma source, etc.

For spray coating, the core to be coated is rotated, whereby a layer can be formed which comprises a uniform mixture of ceramic and mica or like water retentivity imparting particulate substance. The thickness of the mixture layer to be formed is usually 1 to 30 mm although variable with the dimensions of the roll, pressure to be applied, etc.

Another feature of the present invention is that at least in a surface layer portion of the mixture layer thus formed, at least one organic high polymer selected from the group consisting of synthetic resins and waxes is filled in the interstices between particles of the ceramic and particles of the water retentivity imparting particulate substance such as mica.

The organic high polymer is a substance selected from the group consisting of epoxy resin, phenol resin, polyurethane resin, silicone resin, fluorine-containing resin and waxes.

The synthetic resin, wax or like organic high polymer is applied, as it is or in the form of a solution, to the surface of the mixture layer by means such as coater, brush or spray, whereby the high polymer is caused to penetrate into or fill the interstices between the ceramic partices and particles of particulate substance.

The sythetic resin is thereafter hardened by a curing reaction, or the solvent of the synthetic resin or wax solution is evaporated off, whereby the interstices are fully filled with the resin or wax.

Since the organic high polymer penetrates into or fills the interstices or impregnates the surface layer portion of the mixture layer, the material or solution to be used preferably has a low viscosity.

For example when epoxy resin is used as the organic high polymer, the resin per se is, for example, 50 to 500 cps in viscosity.

When the epoxy resin to be used as it is is less than 50 cps in viscosity, it is difficult to obtain the resin, whereas when exceeding 500 cps, the resin encounters difficulty in penetrating into the interstices between the ceramic particles and particles of water retentivity imparting substance such as mica.

Further when other organic high polymer, i.e., phenol resin, polyurethane resin, silicone resin, fluorine-containing resin or wax is to be used, such material or the solution thereof obtained by diluting the material with a suitable solvent needs to have the lowest possible viscosity.

The organic high polymer, such as synthetic resin or wax, fills up the interstices between the ceramic particles and particles of water retentive substance at least in the surface layer portion of the mixture layer. Preferably, the resin or wax fills the surface layer portion having ¼ to ½ of the overall thickness of the mixture layer from the surface thereof since the paper machine press roll is reground during use.

The roll having the mixture layer of the ceramic and the particulate substance thus coated with the organic high polymer is ground over the surface to a surface roughness of 0.2 to 2.0 micrometers (Ra) (according to JIS B0601, except where mica or like water retentivity imparting substance is present), the ground surface being filled with the high polymer in the interstices, whereby a press roll is obtained for use in paper machines.

According to another feature of the present invention, the paper machine press roll has a ceramic layer which is free from mica or like water retentivity imparting particulate substance.

More specifically, the invention provides a paper machine press roll characterized in that the roll comprises a metal core, a ground layer formed over the outer periphery of the core and made of a metal material having a smaller coefficient of expansion than the metal material forming the core, and a ceramic layer formed over the outer periphery of the ground layer, at least a surface layer portion of the ceramic layer being filled in the interstices between ceramic particles with at least one organic high polymer selected from the group consisting of synthetic resins and waxes.

The metal core and the ground layer have the same construction as already described, and the ceramic layer has the above feature and is formed from a metal oxide powder by covering the ground layer around the metal core with the powder material by plasma spray coating.

A synthetic resin, wax or like organic high polymer is applied, as it is or in the form of a solution, to the surface of the ceramic layer by means such as coater, brush or spray, whereby the high polymer is caused to penetrate into or fill the interstices between ceramic particles.

The synthetic resin is thereafter hardened by a curing reaction, or the solvent of the synthetic resin or wax solution is evaporated off, whereby the interstices are fully filled up with the resin or wax.

Since the organic high polymer penetrates into or fills the interstices or impregnates the surface layer portion of the ceramic layer, the material or solution to be used preferably has a low viscosity as already described above.

Preferably, the resin or wax fills the surface layer portion having ¼ to ½ of the overall thickness of the ceramic layer from the surface thereof since the paper machine roll is reground during use.

The roll having the ceramic layer coated with the organic high polymer is ground over the surface to a surface roughness of 0.2 to 2.0 micrometers (Ra) (according to JIS B0601). The ground surface is filled with the high polymer in the interstices. Thus, a press roll is obtained for use in paper machines.

The roll of the invention comprises a metal core, a ground layer formed around the metal core and made of a metal material of small coefficient of expansion, and a mixture layer formed around the ground layer and comprising a ceramic and mica or like water retentivity imparting particular substance. The water retentivity given by the particulate substance such as mica renders wet paper smoothly releasable from the roll, obviating the trouble to be caused by the wet paper.

When an organic high polymer such as synthetic resin or wax is filled in the interstices between ceramic particles and particles of mica or like particulate substance at least in a surface layer portion of the mixture layer, the roll is given improved surface smoothness to release wet paper therefrom more effectively.

When the kind and particle size of mica or like water retentivity imparting substance are altered, the roll is selectively usable for pressing a particular kind of paper.

Further the paper machine press roll of the present invention may be formed with a ceramic layer free from mica or like particulate substance for imparting water retentivity. More specifically, the ceramic layer is formed over the outer periphery of the ground layer around the metal core and has a surface layer portion which is filled with at least one organic high polymer selected from among synthetic resins and waxes, in the interstices between ceramic particles.

The paper machine press roll of the invention having either construction is usable in place of conventional stone rolls, has improved surface smoothness, releases wet paper effecitvely with good stability without permitting adhesion thereto since the ceramic layer surface has no voids, is less likely to permit adhesion of pitch even when used for a prolonged period of time, can be mirror-finished to give surface smoothness to wet paper pressed, has such surface hardness as to be resistant to abrasion by the doctor blade for removing bits of extraneous stock, has a strength to withstand a heavy load or high-speed rotation for a long period of time, is uniform in surface characteristics and can be easily produced with the specified surface characteristics.

The present invention will be described in greater detail with reference to the accompanying drawings.

DESCRIPTION OF THE PREFERRED EMBODIMENTS

Example 1

Figure 1:
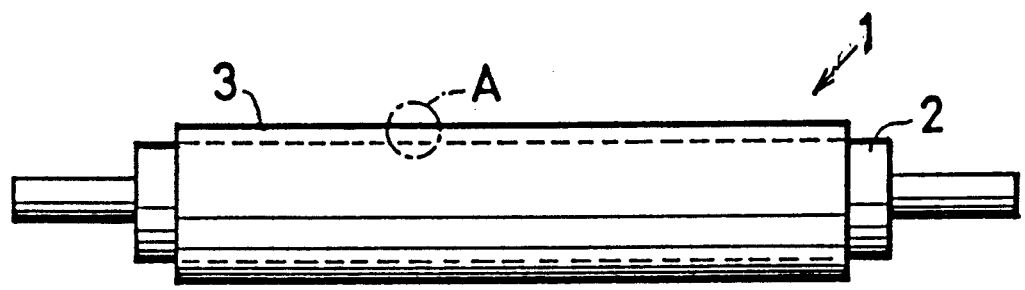
FIG. 1 is a front view schematically showing a paper machine press roll of the invention.

With reference to FIG. 1, a cast iron cylinder ($14.0 \times 10^{-6}/°$ C. in coefficient of expansion) measuring 6000 mm in length, 5000 mm in surface length and 490 mm in diameter was used as the metal core 2 of a paper machine press roll 1. The surface of the core 2 was cleaned and degreased with an organic solvent (trichlene) and then sandblasted to remove rust and extraneous matter and form a rough surface. While rotating the core 2, a nickel-chromium alloy powder (10 to 44 micrometers in particle size) was applied to the outer periphery by a gas spray coating apparatus (using oxygen-acetylene gas) to form a ground layer 4 having a thickness of 100 micrometers (see FIG. 2).

Next, while rotating the core 2 having the ground layer 4, a gray alumina powder, 50 micrometers in mean particle size, was applied to the layer 4 over a period of 6 hours by a water plasma spray coating apparatus to form a ceramic layer 3 of gray alumina powder having a thickness of 5.3 mm.

The water plasma spray coating was conducted under the following conditions.

Input power: 400 V, 400 A (350 KVA)
Spray gun: 380 V, 420 A
Rate of feed of gray alumina: 40 kg/hr (about 230 kg)
Distance between gun and core: 300–400 mm
Traverse speed: 10–20 mm/sec
Effective amount of deposition of gray alumina: about 50%

Figure 3:
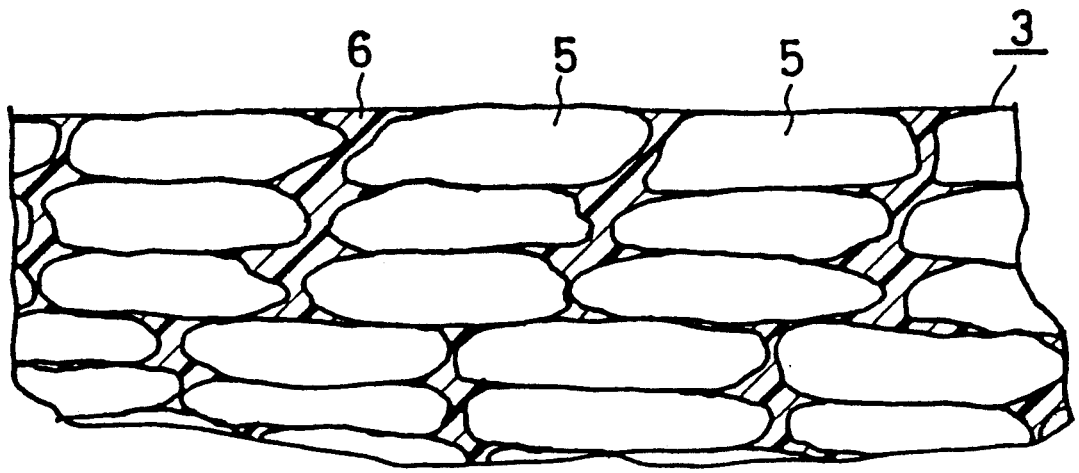
FIG. 3 is an enlarged view in section of the portion B in FIG. 2 to show an organic high polymer as filled in interstices between ceramic particles in a ceramic layer.

Next, the surface of the ceramic-coated roll thus prepared was preheated, and a preheated epoxy resin having a viscosity of 100 to 200 cps (comprising 100 parts by weight of PELNOX 106 as the main component, 80 parts by weight of PELCURE HV19 as a curing agent and 4 parts by weight of an accelerator, product of NIPPON PELNOX Co., Ltd.) was applied by a coater to the surface of the ceramic layer 3 so as to fill the interstices between ceramic particles. The coating was cured to form a resin layer 6 (see FIG. 3).

The surface of the roll coated with the epoxy resin was ground with a diamond abrasive stone for finishing. The paper machine press roll 1 thus obtained was 500.2 mm in outside diameter and 0.5 micrometer (Ra) in surface roughness as determined according to JIS B0601.

The press roll 1 thus prepared was used for pressing wood-free paper at a line pressure of 90 kg/cm and a speed of 800 m/min. The roll was usable for wet paper free of any trouble.

The wood-free paper had the following composition.

| | |
|---|---|
| Broad-leaved tree kraft pulp (LBKP) | 80 parts by weight |
| Coniferous tree kraft pulp (NBKP) | 20 parts by weight |
| Aluminum sulfate | 1 part by weight |
| Talc | 5 parts by weight |
| Size agent | 0.5 part by weight |
| Freeness | 400 c.c. |

Comparative Example 1

The same roll as prepared in the above example except that the ceramic layer 3 was prepared only from gray alumina and was not coated with epoxy resin was used under the same conditions as in Example 1 for pressing the same wood-free paper. The roll became unusable owing to adhesion of paper.

The comparative roll was 3.0 to 5.0 micrometers (Ra) in surface roughness (according to JIS B0601).

Example 2

With reference to FIG. 1, a cast iron cylinder ($14.0 \times 10^{-6}/°$ C. in coefficient of expansion) measuring 6300 mm in length, 3850 mm in surface length and 1120 mm in diameter was used as the metal core 2 of a paper machine press roll 1. The surface of the core 2 was cleaned and degreased with an organic solvent (trichlene) and then sandblasted to remove rust and extraneous matter and form a rough surface. While rotating the core 2, a nickel-chromium alloy powder (10 to 44 micrometers in particle size) was applied to the outer periphery by a gas spray coating apparatus (using oxygen-acetylene gas) to form a ground layer 4 having a thickness of 100 micrometers (see FIG. 2).

Figure 4:
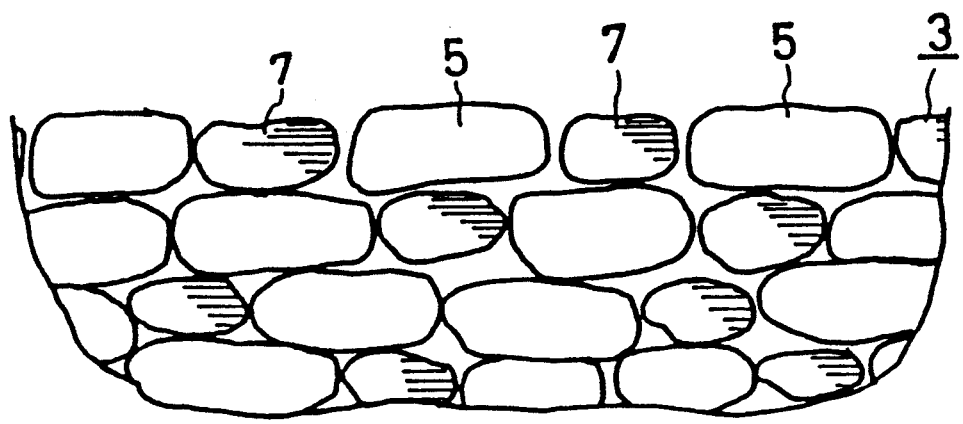
FIG. 4 is an enlarged view in section of the portion B in FIG. 2 to show a mixture layer of a ceramic and mica or like water retentivity imparting particulate substance.

Next, while rotating the core 2 having the ground layer 4, a mixture of gray alumina powder and mica powder (4:1 in weight ratio), 50 micrometers in means particle size, was applied to the layer 4 over a period of 50 hours by a water plasma spray coating apparatus to form a mixture layer 3 of gray alumina powder 5 and mica powder 7 having a thickness of 5.3 mm (see FIG. 4).

The water plasma spray coating was conducted under the following conditions.

Input power: 400 V, 400 A (350 KVA)
Spray gun: 380 V, 420 A
Rate of feed of alumina-mica mixture: 38 kg/hr
Distance between gun and core: 300–400 mm
Traverse speed: 10–20 mm/sec
Effective amount of deposition of alumina-mica mixture: about 50%

Figure 2:
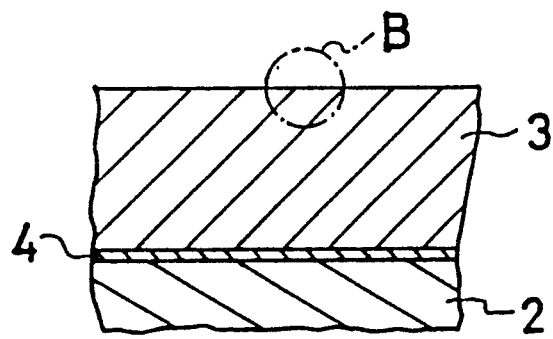
FIG. 2 is an enlarged view in section showing the portion A in FIG. 1.

Subsequently, the surface of the roll was ground with a diamond abrasive stone for finishing. The paper machine press roll 1 thus formed, which is shown in FIGS. 1, 2 and 4, was 1130 mm in outside diameter and 1.5 micrometers in surface roughness (Ra) as determined according to JIS B0601 (except at the mica portions).

The press roll 1 thus prepared was used for pressing wood-free paper at a line pressure of 90 kg/cm and a speed of 800 m/min. The roll was usable for wet paper free of any trouble.

The wood-free paper had the following composition.

| | |
|---|---|
| Broad-leaved tree kraft pulp (LBKP) | 80 parts by weight |
| Coniferous tree kraft pulp (NBKP) | 20 parts by weight |
| Aluminum sulfate | 1 part by weight |
| Talc | 5 parts by weight |
| Size agent | 0.5 part by weight |
| Freeness | 400 c.c. |

Example 3

The surface of a roll having the same mixture layer 3 and prepared in the same manner as in Example 2 was preheated after the formation of the layer 3. A preheated epoxy resin having a viscosity of 100 to 200 cps (comprising 100 parts by weight of PELNOX 106 as the main component, 80 parts by weight of PELCURE HV 19 as a curing agent and 4 parts by weight of an accelerator, product of NIPPON PELNOX Co., Ltd.) was applied by a coater to the surface of the mixture layer 3 of ceramic and mica so as to fill the interstices between ceramic particles and mica particles. The coating was cured to form a resin layer 6 (see FIG. 5).

Figure 5:
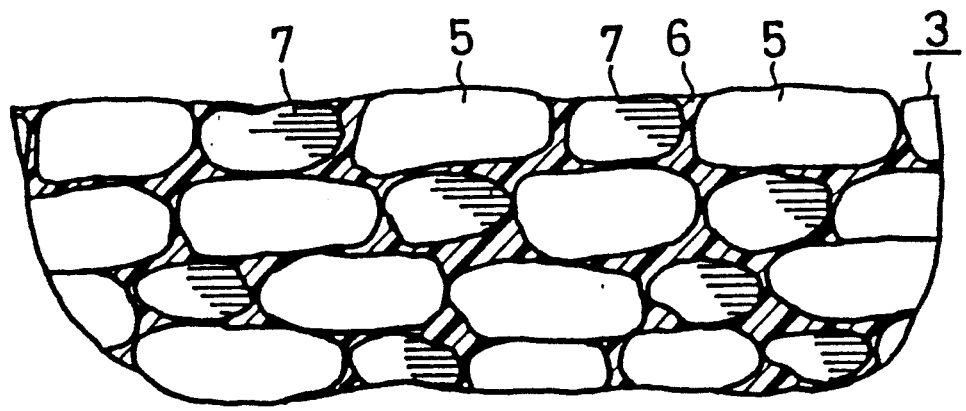
FIG. 5 is an enlarged view in section of the portion B in FIG. 2 to show an organic high polymer as filled in interstices between ceramic particles and particles of mica or like water retentivity imparting particulate substance.

Subsequently, the surface of the roll coated with the epoxy resin was ground with a diamond abrasive stone for finishing. The paper machine press roll 1 thus formed, which is shown in FIGS. 1, 2 and 5, was 0.5 micrometer in surface roughness (Ra) as determined according to JIS B0601 (except at the mica portions).

The press roll 1 thus obtained was used for pressing the same wood-free paper as above under the same conditions as in Example 1. The roll was usable for wet paper free of any trouble.

Comparative Example 2

The same roll as obtained in the above example except that the mixture layer 3 of ceramic and mica was not coated with epoxy resin was prepared. This comparative roll was 3.0 to 5.0 micrometers in surface roughness (Ra) (according to JIS B0601). When the roll was used under the same conditions as in Example 2 for pressing the same wood-free paper as above, the roll became unusable owing to adhesion of paper.

What is claimed is:

1. A paper machine press roll, comprising:
   a metal core;
   a ground layer formed over an outer periphery of the core and made of a metal material having a smaller coefficient of expansion than the metal material forming the core; and
   a mixture formed over an outer periphery of the ground layer and including a ceramic and a water retentivity imparting particulate substance, wherein a surface roughness of the mixture is between 0.2 and 2.0 micrometers (Ra), except where the water retentivity imparting particulate substance is present.

2. A press roll as defined in claim 1, wherein the mixture comprises 5 to 30 wt. % of the water retentivity imparting particulate substance as mixed with the ceramic.

3. A press roll as defined in claim 1, wherein the water retentivity imparting particulate substance is at least one powder selected from a group consisting of mica powder, glass balloons, glass beads, glass powder, stone powder, sand and fluorine-containing resin powder.

4. A press roll as defined in claim 1, further comprising at least one organic high polymer selected from a group consisting of synthetic resins and waxes filled within interstices between particles of the ceramic and particles of the water retentivity imparting substance at least in a surface layer portion of the mixture.

5. A press roll as defined in claim 4, wherein the organic high polymer filled in the interstices in the mixture is at least one substance selected from a group consisting of epoxy resin, phenol resin, polyurethane resin, silicone resin, fluorine-containing resin and waxes.

* * * * *